US010631251B2

(12) United States Patent
Harel

(10) Patent No.: US 10,631,251 B2
(45) Date of Patent: *Apr. 21, 2020

(54) GAIN CONTROL CIRCUIT SUPPORTING DYNAMIC GAIN CONTROL IN A REMOTE UNIT IN A WIRELESS DISTRIBUTION SYSTEM (WDS)

(71) Applicant: Corning Optical Communications LLC, Hickory, NC (US)

(72) Inventor: Dror Harel, Hod Hasharon (IL)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,588

(22) Filed: Apr. 12, 2019

(65) Prior Publication Data

US 2019/0289556 A1 Sep. 19, 2019

Related U.S. Application Data

(63) Continuation of application No. 15/920,778, filed on Mar. 14, 2018, now Pat. No. 10,292,111.

(51) Int. Cl.
*H04W 52/18* (2009.01)
*H04B 1/00* (2006.01)
*H04B 1/10* (2006.01)

(52) U.S. Cl.
CPC .......... *H04W 52/18* (2013.01); *H04B 1/0003* (2013.01); *H04B 1/1027* (2013.01)

(58) Field of Classification Search
CPC .... H04B 1/0003; H04B 1/1027; H04W 52/18

USPC ........ 455/452.1, 456.5, 121, 124, 501, 126; 370/252, 312, 329, 338; 375/257, 295, 375/297
See application file for complete search history.

(56) References Cited

U.S. PATENT DOCUMENTS

| | | | |
|---|---|---|---|
| 5,298,901 A | * | 3/1994 | Lekmine ............... H03M 1/668 341/118 |
| 8,855,036 B2 | | 10/2014 | Sabat et al. |
| 9,231,793 B1 | | 1/2016 | Vareljian et al. |
| 9,420,542 B2 | | 8/2016 | Henia |
| 9,642,094 B1 | | 5/2017 | Harel |
| 9,894,612 B1 | | 2/2018 | Yakobi |

(Continued)

*Primary Examiner* — Tan H Trinh
(74) *Attorney, Agent, or Firm* — C. Keith Montgomery

(57) ABSTRACT

A gain control circuit in a wireless distribution system (WDS) is provided. The gain control circuit generates a combined digital communications signal based on a number of received radio frequency (RF) communications signals. The combined digital communications signal has a digital amplitude(s) representing a summed analog power level(s) of the RF communications signals in a predefined number of binary bits. When the summed analog power level(s) exceeds a maximum analog power level represented by the digital amplitude(s) in the predefined number of binary bits, the gain control circuit determines a selected RF communications signal(s) causing the summed analog power level to exceed the maximum analog power level and attenuates the selected RF communications signal(s) to reduce the summed analog power level to below the maximum analog power level. As such, it is possible to achieve a calculated balance between performance, complexity, and cost in the gain control circuit.

15 Claims, 9 Drawing Sheets

(56) References Cited

U.S. PATENT DOCUMENTS

| | | | |
|---|---|---|---|
| 10,292,111 B1* | 5/2019 | Harel | H04B 1/0003 |
| 2003/0063682 A1 | 4/2003 | Shearer, III | |
| 2003/0162516 A1* | 8/2003 | Solum | H03F 3/211 |
| | | | 455/234.1 |
| 2004/0101067 A1* | 5/2004 | Abe | H03D 1/2245 |
| | | | 375/322 |
| 2005/0111587 A1* | 5/2005 | Abe | H03D 3/007 |
| | | | 375/324 |
| 2005/0163250 A1 | 7/2005 | McCallister | |
| 2005/0163251 A1 | 7/2005 | McCallister | |
| 2007/0165743 A1 | 7/2007 | McCallister | |
| 2007/0230616 A1 | 10/2007 | Zolfaghari et al. | |
| 2008/0146173 A1 | 6/2008 | Nariman et al. | |
| 2009/0004987 A1* | 1/2009 | Akahori | H04B 1/18 |
| | | | 455/251.1 |
| 2012/0039320 A1 | 2/2012 | Lemson et al. | |
| 2013/0003873 A1 | 1/2013 | Findlater et al. | |
| 2014/0024402 A1 | 1/2014 | Singh | |
| 2015/0282105 A1 | 10/2015 | Harel | |
| 2016/0066331 A1 | 3/2016 | Harel | |
| 2017/0279577 A1 | 9/2017 | Shekalim | |
| 2017/0318561 A1 | 11/2017 | Harel et al. | |
| 2018/0019834 A1 | 1/2018 | Schwartzman | |
| 2018/0159628 A1 | 6/2018 | Ben-Shlomo | |

\* cited by examiner

GAIN CONTROL CIRCUIT SUPPORTING DYNAMIC GAIN CONTROL IN A REMOTE UNIT IN A WIRELESS DISTRIBUTION SYSTEM (WDS)

PRIORITY APPLICATION

This application is a continuation of U.S. application Ser. No. 15/920,778, filed Mar. 14, 2018, the entire contents of which are hereby incorporated by reference.

BACKGROUND

The disclosure relates generally to wireless distribution systems (WDSs), such as distributed antenna systems (DASs), remote radio head (RRH) systems, and small radio cell systems, and more particularly to supporting dynamic gain control in a remote unit(s).

Wireless customers are increasingly demanding wireless communications services, such as cellular communications services and Wireless Fidelity (WiFi) services. Thus, small cells, and more recently WiFi services, are being deployed indoors. At the same time, some wireless customers use their wireless communications devices in areas that are poorly serviced by conventional cellular networks, such as inside certain buildings or areas where there is little cellular coverage. One response to the intersection of these two concerns has been the use of WDSs. Examples of WDSs include DASs, RRH systems, and small radio cell systems (e.g., femtocell systems). WDSs include remote units configured to receive and transmit downlink communications signals to client devices within the antenna range of the respective remote units. WDSs can be particularly useful when deployed inside buildings or other indoor environments where the wireless communications devices may not otherwise be able to effectively receive radio frequency (RF) signals from a source.

In this regard, FIG. 1 illustrates a wireless distribution system (WDS) 100 that is configured to distribute communications services to remote coverage areas 102(1)(1)-102(M)(N), where 'N' is the number of remote coverage areas. The WDS 100 can be configured to support a variety of communications services that can include cellular communications services, wireless communications services, such as RF identification (RFID) tracking, WiFi, local area network (LAN), wireless LAN (WLAN), and wireless solutions (Bluetooth, WiFi Global Positioning System (GPS) signal-based, and others) for location-based services, and combinations thereof, as examples. For example, the WDS 100 may be a DAS or an RRH system. The remote coverage areas 102(1)(1)-102(M)(N) are created by and centered on remote units 104(1)(1)-104(M)(N) connected to a head-end unit (HEU) 106. The remote units 104(1)(1)-104(M)(N) are shown arranged in rows '1-M,' each with columns '1-N' for convenience, and are located in a building 108 or in an area of the building 108. The HEU 106 may be communicatively coupled to a base transceiver station (BTS) or a baseband unit (BBU). The HEU 106 receives downlink communications signals 112D from the BTS and/or the BBU to be communicated to the remote units 104(1)(1)-104(M)(N). The downlink communications signals 112D are communicated by the HEU 106 over a communications link 114 to the remote units 104(1)(1)-104(M)(N). The remote units 104(1)(1)-104(M)(N) are configured to receive the downlink communications signals 112D from the HEU 106 over the communications link 114. The remote units 104(1)(1)-104(M)(N) may include an RF transmitter/receiver (not shown) and a respective antenna operably connected to the RF transmitter/receiver to wirelessly distribute the communications services to user equipment (UE) 116 within their respective remote coverage areas 102(1)(1)-102(M)(N). The remote units 104(1)(1)-104(M)(N) are also configured to receive uplink communications signals 112U from the UE 116 in their respective remote coverage areas 102(1)(1)-102(M)(N) to be communicated to the HEU 106.

With continuing reference to FIG. 1, each of the remote units 104(1)(1)-104(M)(N) may receive multiple uplink communications signals 112U in multiple RF bands. In this regard, each remote unit may first combine the multiple uplink communications signals 112U into a combined uplink communications signal and then convert the combined uplink communications signal into a digital uplink communications signal for transmission to the HEU 106 over the communications link 114. Notably, the remote unit may receive the multiple uplink communications signals 112U at multiple power levels. Accordingly, the combined uplink communications signal has an aggregated power level that is proportionally related to a sum of the multiple power levels of the multiple uplink communications signals 112U. When the remote unit converts the combined uplink communications signal into the digital communications signal, the aggregated power level is represented by a digital amplitude value of a predefined number of binary bits. For example, if the predefined number of binary bits equals ten (10), then the digital amplitude value can represent 1,024 ($2^{10}$) different aggregated power levels.

Notably, it is possible for the digital amplitude value to represent an increased number of the aggregated power level by increasing the predefined number of binary bits associated with the digital amplitude value. As a result, the aggregated power level can be digitally represented with increased granularity. However, increasing the predefined number of binary bits can also result in increased processing complexity and overhead, thus leading to increased hardware and/or software costs in the remote unit. As such, it may be desirable to digitally represent the aggregated power level with acceptable granularity based on reasonable number of binary bits.

No admission is made that any reference cited herein constitutes prior art. Applicant expressly reserves the right to challenge the accuracy and pertinency of any cited documents.

SUMMARY

Embodiments of the disclosure relate to a gain control circuit in a remote unit in a wireless distribution system (WDS). In examples discussed herein, the gain control circuit can be employed to support dynamic gain control in a remote unit(s) in the WDS. The gain control circuit is configured to receive a number of radio frequency (RF) communications signals and generate a combined digital communications signal based on the RF communications signals. The combined digital communications signal has a digital amplitude(s) representing a summed analog power level(s) of the RF communications signals in a predefined number of binary bits. Notably, the predefined number of binary bits can represent the summed analog power level(s) up to a maximum analog power level before becoming overflown and causing the digital amplitude(s) to be clipped. A digital signal processing circuit is configured to detect when the summed analog power level exceeds the maximum analog power level that can be digitally represented by the digital amplitude(s) in the predefined number of binary bits.

The digital signal processing circuit is configured to determine a selected RF communications signal(s) among the RF communications signals causing the summed analog power level to exceed the maximum analog power level. The selected RF communications signal(s) can be attenuated to reduce the summed analog power level to below the maximum analog power level. As an example, by performing dynamic gain control based on the summed analog power level(s), it is possible to digitally represent the summed analog power level(s) in the combined digital communications signal using a desired number of binary bits, thus helping to achieve a calculated balance between performance, complexity, and cost in the gain control circuit.

In one exemplary aspect, a gain control circuit in a WDS is provided. The gain control circuit includes a plurality of RF circuits configured to receive and amplify a plurality of RF communications signals, respectively. The gain control circuit also includes signal conversion circuitry comprising a plurality of RF signal inputs coupled to the plurality of RF circuits and a digital signal output. The signal conversion circuitry is configured to receive the plurality of RF communications signals via the plurality of RF signal inputs. The signal conversion circuitry is also configured to generate a combined digital communications signal based on the plurality of RF communications signals. The combined digital communications signal has a digital amplitude representing a summed analog power level of the plurality of RF communications signals in a predefined number of binary bits. The signal conversion circuitry is also configured to provide the combined digital communications signal to the digital signal output. The gain control circuit also includes a digital signal processing circuit coupled to the digital signal output. The digital signal processing circuit is configured to determine whether the summed analog power level exceeds a maximum analog power level represented by the digital amplitude in the predefined number of binary bits. In response to determining that the summed analog power level exceeds the maximum analog power level, the digital signal processing circuit is also configured to determine a selected RF circuit among the plurality of RF circuits that generates a selected RF communications signal among the plurality of RF communications signals at a selected analog power level causing the summed analog power level to exceed the maximum analog power level. The digital signal processing circuit is also configured to control the selected RF circuit to attenuate the selected RF communications signal to reduce the summed analog power level to below the maximum analog power level.

An additional embodiment of the disclosure relates to a method for supporting dynamic gain control in a WDS. The method includes receiving a plurality of RF communications signals. The method also includes generating a combined digital communications signal based on the plurality of RF communications signals. The combined digital communications signal has a digital amplitude representing a summed analog power level of the plurality of RF communications signals in a predefined number of binary bits. The method also includes determining whether the summed analog power level exceeds a maximum analog power level represented by the digital amplitude in the predefined number of binary bits. The method also includes, in response to determining that the summed analog power level exceeds the maximum analog power level, determining a selected RF communications signal among the plurality of RF communications signals at a selected analog power level causing the summed analog power level to exceed the maximum analog power level. The method also includes attenuating the selected RF communications signal to reduce the summed analog power level to below the maximum analog power level.

An additional embodiment of the disclosure relates to a remote unit in a WDS. The remote unit includes a gain control circuit. The gain control circuit includes a plurality of RF circuits configured to receive and amplify a plurality of RF communications signals, respectively. The gain control circuit also includes signal conversion circuitry comprising a plurality of RF signal inputs coupled to the plurality of RF circuits and a digital signal output. The signal conversion circuitry is configured to receive the plurality of RF communications signals via the plurality of RF signal inputs. The signal conversion circuitry is also configured to generate a combined digital communications signal based on the plurality of RF communications signals. The combined digital communications signal has a digital amplitude representing a summed analog power level of the plurality of RF communications signals in a predefined number of binary bits. The signal conversion circuitry is also configured to provide the combined digital communications signal to the digital signal output. The gain control circuit also includes a digital signal processing circuit coupled to the digital signal output. The digital signal processing circuit is configured to determine whether the summed analog power level exceeds a maximum analog power level represented by the digital amplitude in the predefined number of binary bits. In response to determining that the summed analog power level exceeds the maximum analog power level, the digital signal processing circuit is also configured to determine a selected RF circuit among the plurality of RF circuits that generates a selected RF communications signal among the plurality of RF communications signals at a selected analog power level causing the summed analog power level to exceed the maximum analog power level. The digital signal processing circuit is also configured to control the selected RF circuit to attenuate the selected RF communications signal to reduce the summed analog power level to below the maximum analog power level.

An additional embodiment of the disclosure relates to a WDS. The WDS includes a plurality of remote units. The WDS also includes a head-end unit (HEU) coupled to the plurality of remote units via a plurality of communications mediums, respectively. The HEU is configured to distribute a plurality of downlink communications signals to the plurality of remote units via the plurality of communications mediums, respectively. The HEU is also configured to receive a plurality of uplink communications signals from the plurality of remote units via the plurality of communications mediums, respectively. At least one remote unit among the plurality of remote units includes a gain control circuit. The gain control circuit includes a plurality of RF circuits configured to receive and amplify a plurality of RF communications signals, respectively. The gain control circuit also includes signal conversion circuitry comprising a plurality of RF signal inputs and a digital signal output. The signal conversion circuitry is configured to receive the plurality of RF communications signals via the plurality of RF signal inputs, respectively. The signal conversion circuitry is also configured to generate a combined digital communications signal based on the plurality of RF communications signals. The combined digital communications signal has a digital amplitude configured to represent a summed analog power level of the plurality of RF communications signals in a predefined number of binary bits. The signal conversion circuitry is also configured to provide the combined digital communications signal to the digital signal output. The gain control circuit also includes a digital signal processing circuit coupled to the digital signal output. The digital signal processing circuit is configured to analyze the combined digital communications signal to determine whether the summed analog power level exceeds a maximum analog power level that can be represented by the predefined number of binary bits. In response to determining that the summed analog power level exceeds the maximum analog power level, the digital signal processing circuit is also configured to determine a selected RF circuit among the plurality of RF circuits that generates a selected RF communications signal among the plurality of RF communications signals at a selected analog power level causing the summed analog power level to exceed the maximum analog power level. The digital signal processing circuit is also configured to control the selected RF circuit to attenuate the selected RF communications signal to reduce the summed analog power level to below the maximum analog power level.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to a gain control circuit in a remote unit in a wireless distribution system (WDS). In examples discussed herein, the gain control circuit can be employed to support dynamic gain control in a remote unit(s) in the WDS. The gain control circuit is configured to receive a number of radio frequency (RF) communications signals and generate a combined digital communications signal based on the RF communications signals. The combined digital communications signal has a digital amplitude(s) representing a summed analog power level(s) of the RF communications signals in a predefined number of binary bits. Notably, the predefined number of binary bits can represent the summed analog power level(s) up to a maximum analog power level before becoming overflown and causing the digital amplitude(s) to be clipped. A digital signal processing circuit is configured to detect when the summed analog power level exceeds the maximum analog power level that can be digitally represented by the digital amplitude(s) in the predefined number of binary bits. The digital signal processing circuit is configured to determine a selected RF communications signal(s) among the RF communications signals causing the summed analog power level to exceed the maximum analog power level. The selected RF communications signal(s) can be attenuated to reduce the summed analog power level to below the maximum analog power level. As an example, by performing dynamic gain control based on the summed analog power level(s), it is possible to digitally represent the summed analog power level(s) in the combined digital communications signal using a desired number of binary bits, thus helping to achieve a calculated balance between performance, complexity, and cost in the gain control circuit.

Figure 1:
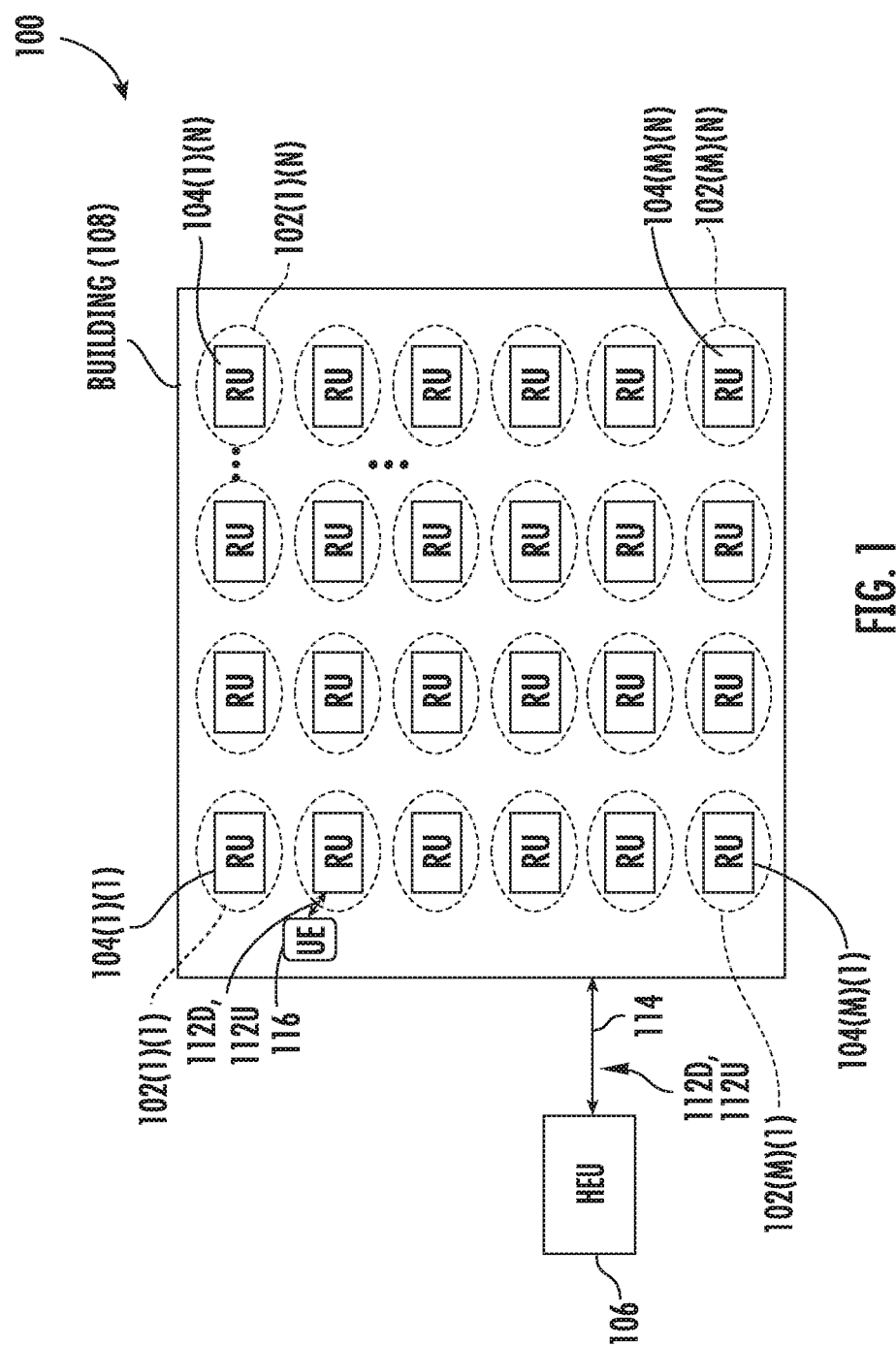
FIG. 1 is a schematic diagram of an exemplary indoor wireless distribution system (WDS)
Figure 2:
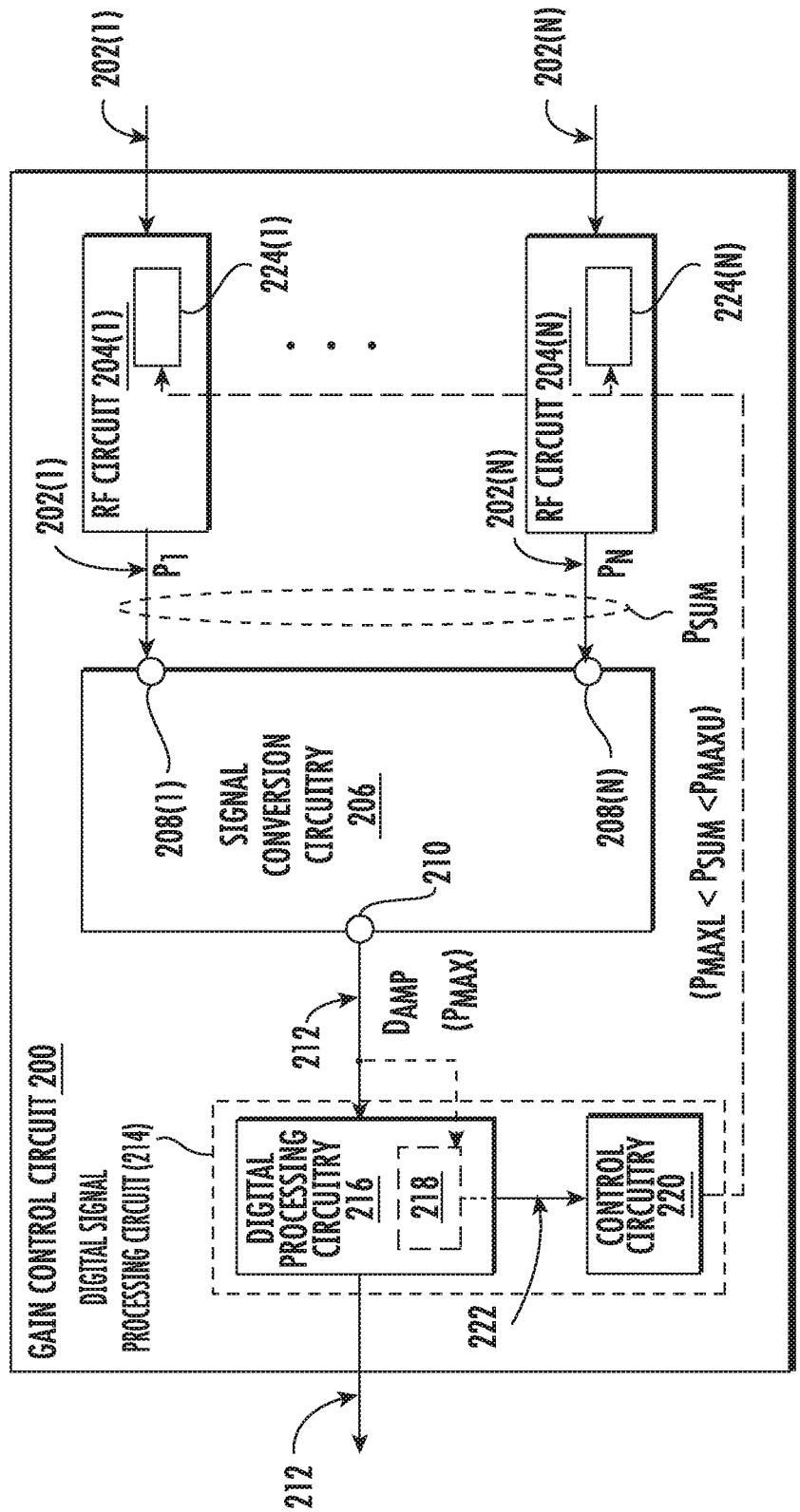
FIG. 2 is a schematic diagram of an exemplary gain control circuit, which can be provided in a remote unit(s) in a WDS to support dynamic gain control based on a summed analog power level(s) of a plurality of radio frequency (RF) communications signals.

In this regard, FIG. 2 is a schematic diagram of an exemplary gain control circuit 200, which can be provided in a remote unit(s) in a WDS to support dynamic gain control based on a summed analog power level $P_{SUM}$ of a plurality of RF communications signals 202(1)-202(N). The gain control circuit 200 includes a plurality of RF circuits 204(1)-204(N) configured to receive the RF communications signals 202(1)-202(N) and amplify the RF communications signals 202(1)-202(N) to a plurality of power levels $P_1$-$P_N$, respectively. The RF communications signals 202(1)-202(N) are received in respective original analog waveforms (e.g., sinusoid waveform), wherein the power levels $P_1$-$P_N$ are represented by time-variant amplitudes of the analog waveforms. In this regard, the summed analog power level $P_{SUM}$ equals approximately a sum of the power levels $P_1$-$P_N$ ($P_{SUM} \approx \Sigma_{i=1}^{N} P_i$). In a non-limiting example, each of the RF communications signals 202(1)-202(N) corresponds to a respective RF band.

The gain control circuit 200 includes signal conversion circuitry 206 that includes a plurality of RF signal inputs 208(1)-208(N) and a digital signal output 210. The signal conversion circuitry 206 receives the RF communications signals 202(1)-202(N) via the RF signal inputs 208(1)-208(N), respectively. The signal conversion circuitry 206 is configured to generate a combined digital communications signal 212 based on the RF communications signals 202(1)-

202(N) and provide the combined digital communications signal 212 to the digital signal output 210. As discussed below in FIG. 4, the signal conversion circuitry 206 may first combine the RF communications signals 202(1)-202(N) into a combined RF communications signal and then convert the combined RF communications signal into the combined digital communications signal 212. Alternatively, as discussed below in FIG. 5, the signal conversion circuitry 206 may first convert the RF communications signals 202(1)-202(N) into a number of digital communications signals and then combine the digital communications signals to generate the combined digital communications signal 212. It should be appreciated that the gain control circuit 200 can support dynamic gain control based on the summed analog power level $P_{SUM}$ independent of specific implementations of the signal conversion circuitry 206.

As opposed to the RF communications signals 202(1)-202(N) that are received in respective original analog waveforms, the combined digital communications signal 212 consists of time-variant digital samples of the RF communications signals 202(1)-202(N) generated based on a defined sample interval. The combined digital communications signal 212 has a digital amplitude $D_{AMP}$ representing the summed analog power level $P_{SUM}$ in a predefined number of binary bits. In this regard, the digital amplitude $D_{AMP}$ can be digitally encoded based on the predefined number of binary bits to represent a number of discrete values of the summed analog power level $P_{SUM}$. For example, if the predefined number of binary bits equals five (5), the digital amplitude $D_{AMP}$ can be digitally encoded (from binary value 00000 to binary value 11111) to represent thirty-two (32) distinct discrete values of the summed analog power level $P_{SUM}$. Accordingly, if the binary value 00000 represents a minimum value of the summed analog power level $P_{SUM}$, then the binary value 11111 would represent a maximum value of the summed analog power level $P_{SUM}$. As such, if the summed analog power level $P_{SUM}$ exceeds the maximum value that can be represented by the binary value 11111, the digital amplitude $D_{AMP}$ would be reset to binary value 00000. In this regard, it would be impossible to determine whether the binary value 00000 actually represents the minimum value of the summed analog power level $P_{SUM}$, or an analog power level higher than the maximum value of the summed analog power level $P_{SUM}$. As a result, the binary value representing the summed analog power level $P_{SUM}$ becomes overflown, thus causing the digital amplitude $D_{AMP}$ to be clipped (hereinafter referred to as "digital amplitude clipping").

Although it may be possible to increase the predefined number of binary bits to represent more distinct discrete values of the summed analog power level $P_{SUM}$, such a measure comes at an expense of increased hardware costs and software complexity in the gain control circuit 200. Moreover, it may be difficult to predict an exact number of the predefined binary bits to digitally represent all possible values of the summed analog power level $P_{SUM}$ to prevent the digital amplitude $D_{AMP}$ from being clipped. Furthermore, it may also be difficult and costly to perform hardware and/or software upgrades to increase the predefined number of binary bits in the field. Hence, it may be desirable to overcome digital amplitude clipping without changing the predefined number of binary bits.

In this regard, the gain control circuit 200 is configured to detect the digital amplitude clipping through digital signal analysis and overcome the digital amplitude clipping via dynamic gain control. More specifically, the gain control circuit 200 includes a digital signal processing circuit 214 coupled to the digital signal output 210. The digital signal processing circuit 214 receives the combined digital communications signal 212 via the digital signal output 210. The digital signal processing circuit 214 is configured to determine whether the summed analog power level $P_{SUM}$ exceeds a maximum analog power level $P_{MAX}$ that can be represented by the digital amplitude $D_{AMP}$ in the predefined number of binary bits. In a non-limiting example, the digital signal processing circuit 214 performs such digital analysis as Fast Fourier Transform (FFT) on the combined digital communications signal 212 to determine whether the summed analog power level $P_{SUM}$ exceeds the maximum analog power level $P_{MAX}$. In this regard, the combined digital communications signal 212 is converted from time domain to frequency domain and the spectrum is analyzed to identify which signal and/or channel is the strongest and could cause the summed analog power level $P_{SUM}$ to exceed the maximum analog power level $P_{MAX}$ that can be represented by the digital amplitude $D_{AMP}$ in the predefined number of binary bits.

In response to determining that the summed analog power level $P_{SUM}$ exceeds the maximum analog power level $P_{MAX}$ represented by the predefined number of binary bits, the digital signal processing circuit 214 further determines at least one selected RF circuit among the RF circuits 204(1)-204(N) that generates at least one selected RF communications signal among the RF communications signals 202(1)-202(N) in at least one selected analog power level causing the summed analog power level $P_{SUM}$ to exceed the maximum power level $P_{MAX}$ represented by the predefined number of binary bits. Accordingly, the digital signal processing circuit 214 controls the selected RF circuit to dynamically attenuate the selected RF communications signal (e.g., in one or more corrective iterations) to reduce the summed analog power level $P_{SUM}$ to below the maximum analog power level $P_{MAX}$ represented by the predefined number of binary bits. By performing dynamic gain control based on the summed analog power level $P_{SUM}$, it is possible to digitally represent the summed analog power level $P_{SUM}$ in the combined digital communications signal 212 using a desired number of binary bits, thus helping to achieve a calculated balance between performance, complexity, and cost in the gain control circuit 200.

The gain control circuit 200 may be configured to support dynamic gain control based on a process. In this regard, FIG. 3 is a flowchart of an exemplary process 300 that can be employed by the gain control circuit 200 of FIG. 2 to overcome digital amplitude clipping based on dynamic gain control.

Figure 3:
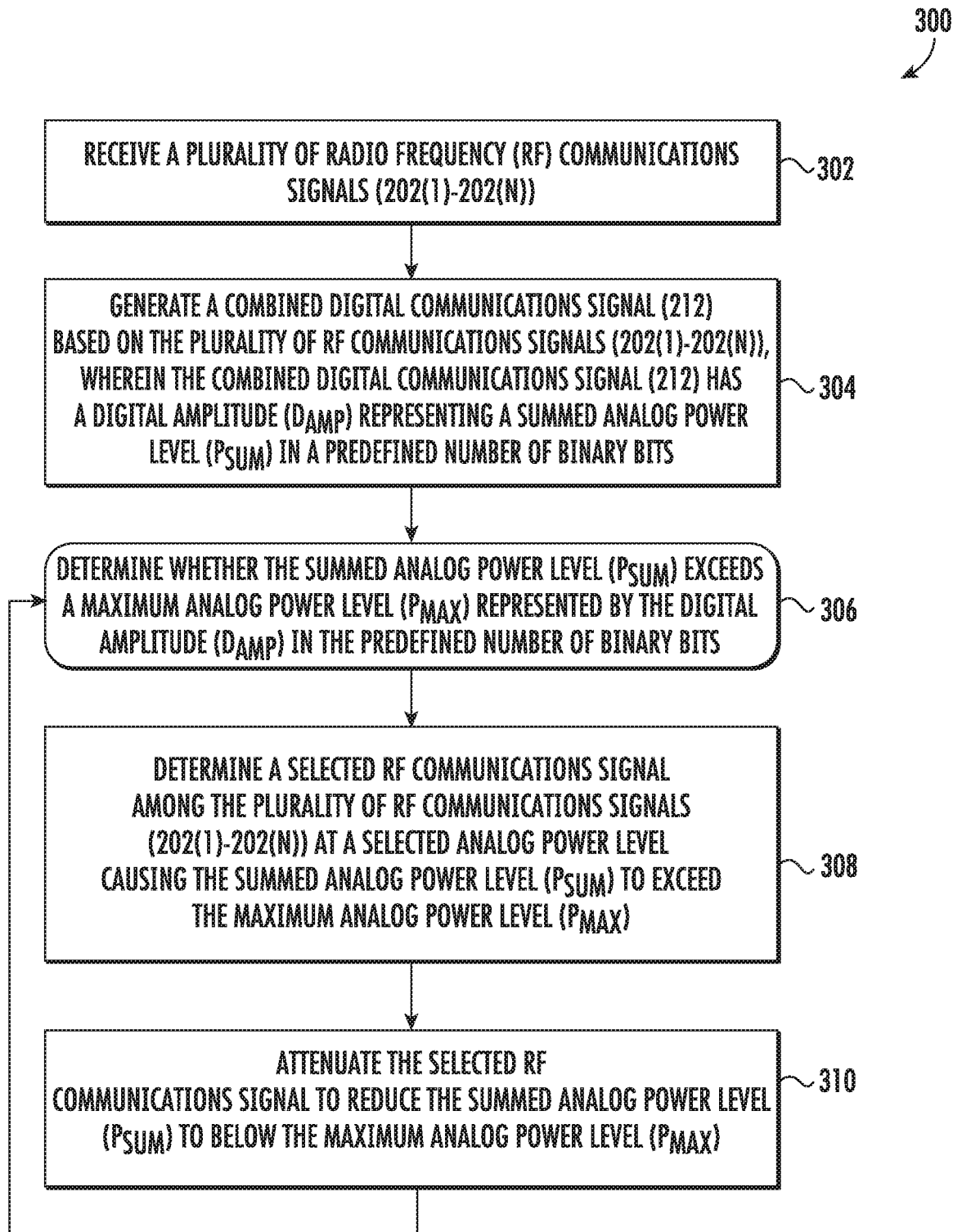
FIG. 3 is a flowchart of an exemplary process that can be employed by the gain control circuit of FIG. 2 to overcome digital amplitude clipping based on dynamic gain control.

With reference to FIG. 3, the signal conversion circuitry 206 receives the RF communications signals 202(1)-202(N) from the RF circuits 204(1)-204(N), respectively (block 302). The signal conversion circuitry 206 generates the combined digital communications signal 212 based on the RF communications signals 202(1)-202(N) (block 304). The combined digital communications signal 212 has the digital amplitude $D_{AMP}$ representing the summed analog power level $P_{SUM}$ in the predefined number of binary bits. The digital signal processing circuit 214 determines whether the summed analog power level $P_{SUM}$ exceeds the maximum analog power level $P_{MAX}$ represented by the digital amplitude $D_{AMP}$ in the predefined number of binary bits (block 306). In response to determining that the summed analog power level $P_{SUM}$ exceeds the maximum analog power level $P_{MAX}$, the digital signal processing circuit 214 determines the selected RF circuit that generates the selected RF communications signal at the selected analog power level causing the summed analog power level $P_{SUM}$ to exceed the maximum analog power level $P_{MAX}$ (block 308). Further, the digital signal processing circuit 214 can control the selected RF circuit to attenuate the selected RF communications signal to reduce the summed analog power level $P_{SUM}$ to below the maximum analog power level $P_{MAX}$ (block 310). The process 300 then returns to block 306 to continue monitoring the combined digital communications signal 212. The process 300 will remain in block 306 to continue monitoring the combined digital communications signal 212 in response to determining that the summed analog power level $P_{SUM}$ does not exceed the maximum analog power level $P_{MAX}$. In this regard, the digital signal processing circuit 214 can employ the process 300 for continuous monitoring of the combined digital communications signal 212 in the gain control circuit 200.

With reference back to FIG. 2, in a non-limiting example, the gain control circuit 200 can further implement a power level hysteresis ε when determining whether the summed analog power level $P_{SUM}$ exceeds the maximum analog power level $P_{MAX}$ and when controlling the selected RF circuit to adjust the selected analog power level of the selected RF communications signal. More specifically, an upper maximum analog power level $P_{MAXU}$ and a lower maximum analog power level $P_{MAXL}$ are defined. The upper maximum analog power level $P_{MAXU}$ equals the maximum analog power level $P_{MAX}$ plus the power level hysteresis ε ($P_{MAXU}=P_{MAX}+ε$), and the lower maximum analog power level $P_{MAXL}$ equals the maximum analog power level $P_{MAX}$ minus the power level hysteresis ε ($P_{MAXL}=P_{MAX}-ε$).

The gain control circuit 200 determines whether the summed analog power level $P_{SUM}$ is higher than the upper maximum analog power level $P_{MAXU}$. When the gain control circuit 200 determines that the summed analog power level $P_{SUM}$ is higher than the upper maximum analog power level $P_{MAXU}$, the gain control circuit 200 controls the selected RF circuit to attenuate the selected RF communications signal to reduce the summed analog power level $P_{SUM}$ to below the upper maximum analog power level $P_{MAXU}$. To prevent the selected RF communications signal from being over-attenuated, the gain control circuit 200 also determines whether the summed analog power level $P_{SUM}$ is lower than the lower maximum analog power level $P_{MAXL}$. When the gain control circuit 200 determines that the summed analog power level $P_{SUM}$ is lower than the lower maximum analog power level $P_{MAXL}$, the gain control circuit 200 controls the selected RF circuit to amplify the selected RF communications signal to increase the summed analog power level $P_{SUM}$ to above the lower maximum analog power level $P_{MAXL}$. In this regard, the gain control circuit 200 is configured to maintain the summed analog power level $P_{SUM}$ between the lower maximum analog power level $P_{MAXL}$ and the upper maximum analog power level $P_{MAXU}$ ($P_{MAXL}<P_{SUM}<P_{MAXU}$).

The digital signal processing circuit 214 may include digital processing circuitry 216, signal analysis circuitry 218, and control circuitry 220. The digital processing circuitry 216 may be configured to packetize the combined digital communications signal 212 based on such digital communications protocol as common public radio interface (CPRI), or any other suitable digital communications protocols. In a non-limiting example, the control circuitry 220 can be provided as a microprocessor, a digital signal processor (DSP), a micro controller, or a field-programmable gate array (FPGA). The digital processing circuitry 216, the signal analysis circuitry 218, and the control circuitry 220 may be integrated into an integrated circuit (IC) or provided in separate ICs.

The signal analysis circuitry 218 can be configured to determine whether the summed analog power level $P_{SUM}$ is higher than the maximum analog power level $P_{MAX}$ (or the upper maximum analog power level $P_{MAXU}$) by performing the FFT, for example, on the combined digital communications signal 212. The signal analysis circuitry 218 can also be configured to determine whether the summed analog power level $P_{SUM}$ is lower than the maximum analog power level $P_{MAX}$ (or the lower maximum analog power level $P_{MAXL}$) by performing the FFT, for example, on the combined digital communications signal 212. The signal analysis circuitry 218 may provide an indication signal 222 to the control circuitry 220 in response to determining that the summed analog power level $P_{SUM}$ is higher than the maximum analog power level $P_{MAX}$ (or the upper maximum analog power level $P_{MAXU}$) or lower than the maximum analog power level $P_{MAX}$ (or the lower maximum analog power level $P_{MAXL}$).

In response to receiving the indication signal 222 indicating that the summed analog power level $P_{SUM}$ is higher than the upper maximum analog power level $P_{MAXU}$, the control circuitry 220 determines the selected RF circuit and controls the selected RF circuit to attenuate the selected RF communications signal to reduce the summed analog power level $P_{SUM}$ to below the upper maximum analog power level $P_{MAXU}$. In a non-limiting example, the control circuitry 220 can determine the selected RF circuit as an RF circuitry among the RF circuits 204(1)-204(N) that generates the selected RF communications signal at a highest analog power level. In contrast, in response to receiving the indication signal 222 indicating that the summed analog power level $P_{SUM}$ is lower than the lower maximum analog power level $P_{MAXL}$, the control circuitry 220 determines the selected RF circuit and controls the selected RF circuit to amplify the selected RF communications signal to increase the summed analog power level $P_{SUM}$ to above the lower maximum analog power level $P_{MAXL}$. In a non-limiting example, the control circuitry 220 can determine the selected RF circuit as an RF circuitry among the RF circuits 204(1)-204(N) that generates the selected RF communications signal at a lowest power level. Accordingly, the control circuitry 220 maintains the summed analog power level $P_{SUM}$ between the lower maximum analog power level $P_{MAXL}$ and the upper maximum analog power level $P_{MAXU}$ ($P_{MAXL}<P_{SUM}<P_{MAXU}$).

The RF circuits 204(1)-204(N) may include a plurality of gain controllers 224(1)-224(N) configured to attenuate the RF communications signals 202(1)-202(N), respectively. In this regard, in response to receiving the indication signal 222 indicating that the summed analog power level $P_{SUM}$ is higher than the upper maximum analog power level $P_{MAXU}$, the control circuitry 220 may control a selected gain controller in the selected RF circuit to attenuate the selected RF communications signal to reduce the summed analog power level $P_{SUM}$ to below the upper maximum analog power level $P_{MAXU}$. In contrast, in response to receiving the indication signal 222 indicating that the summed analog power level $P_{SUM}$ is lower than the lower maximum analog power level $P_{MAXL}$, the control circuitry 220 may control the selected gain controller in the selected RF circuit to amplify the selected RF communications signal to increase the summed analog power level $P_{SUM}$ to above the lower maximum analog power level $P_{MAXL}$.

In a non-limiting example, the control circuitry 220 may control the selected RF circuit to maintain the summed analog power level $P_{SUM}$ between the lower maximum analog power level $P_{MAXL}$ and the upper maximum analog power level $P_{MAXU}$ in multiple adjustment iterations. For example, the control circuitry 220 can set the maximum analog power level $P_{MAX}$ to an initial value of 0 dBm and set an initial gain of the selected RF circuit to 30 dBm. Subsequently, the gain control circuitry 220 can adjust a respective gain of the selected gain controller by ±Δ dB (ε<Δ<2ε) in each of the multiple adjustment iterations, until the summed analog power level $P_{SUM}$ is maintained between the lower maximum analog power level $P_{MAXL}$ and the upper maximum analog power level $P_{MAXU}$. More specifically, the control circuitry 220 adjusts the respective gain of the selected gain controller by −Δ dB to reduce the selected power level of the selected RF communications signal when the summed analog power level $P_{SUM}$ is above the upper maximum analog power level $P_{MAXU}$. In contrast, the control circuitry 220 adjusts the respective gain of the selected gain controller by +Δ dB to increase the selected power level of the selected RF communications signal when the summed analog power level $P_{SUM}$ is below the lower maximum analog power level $P_{MAXL}$.

Figure 4:
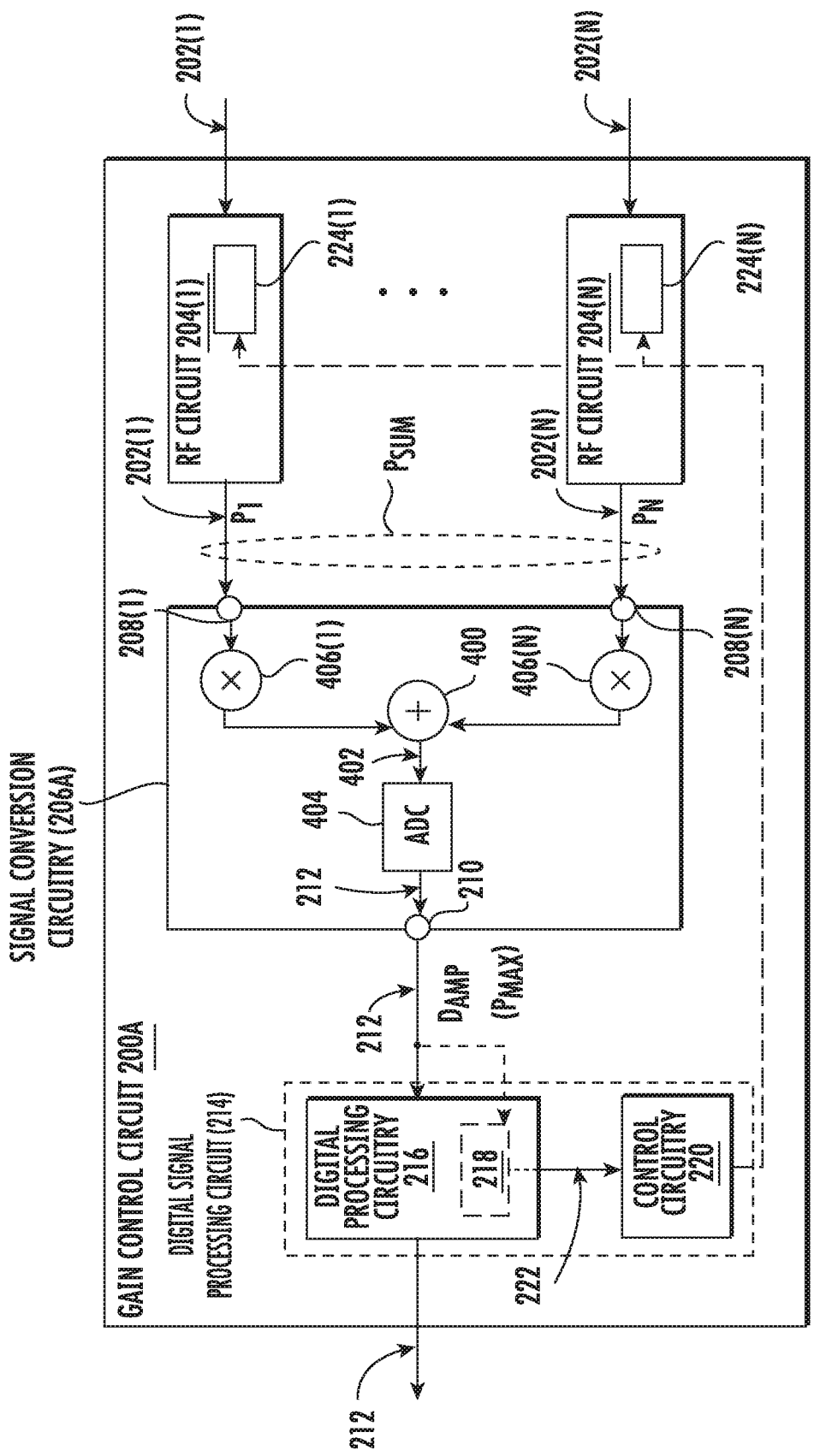
FIG. 4 is a schematic diagram of an exemplary gain control circuit, which is functionally equivalent to the gain control circuit of FIG. 2, with signal conversion circuitry implemented according to one embodiment of the present disclosure.

As previously mentioned, the signal conversion circuitry 206 may first combine the RF communications signals 202(1)-202(N) into a combined RF communications signals and then convert the combined RF communications signal into the combined digital communications signal 212. In this regard, FIG. 4 is a schematic diagram of an exemplary gain control circuit 200A, which is functionally equivalent to the gain control circuit 200 of FIG. 2, with signal conversion circuitry 206A implemented according to one embodiment of the present disclosure. Common elements between FIGS. 2 and 4 are shown therein with common element numbers and will not be re-described herein.

The signal conversion circuitry 206A includes an analog signal combiner 400 coupled to the RF signal inputs 208(1)-208(N). The analog signal combiner 400 is configured to receive the RF communications signals 202(1)-202(N) via the RF signal inputs 208(1)-208(N) respectively. The analog signal combiner 400 is configured to combine the RF communications signals 202(1)-202(N) to generate a combined RF communications signal 402.

The signal conversion circuitry 206A includes an analog-to-digital converter (ADC) 404 coupled between the analog signal combiner 400 and the digital signal output 210. The ADC 404 is configured to receive the combined RF communications signal 402 from the analog signal combiner 400 and convert the combined RF communications signal 402 into the combined digital communications signal 212 having the digital amplitude $D_{AMP}$ representing the summed analog power level $P_{SUM}$ in the predefined number of binary bits. The ADC 404 provides the combined digital communications signal 212 to the digital signal output 210.

In this regard, the ADC 404 may inherently determine the predefined number of binary bits representing the digital amplitude $D_{AMP}$. For example, the predefined number of binary bits may be determined by size of a register in the ADC 404. As such, the signal analysis circuitry 218 can be configured to determine whether the summed analog power level $P_{SUM}$ exceeds the maximum analog power level $P_{MAX}$ represented by predefined number of binary bits inherently determined by the ADC 404.

The signal conversion circuitry 206A may include a plurality of mixers 406(1)-406(N) provided between the analog signal combiner 400 and the RF signal inputs 208(1)-208(N), respectively. The mixers 406(1)-406(N) may be configured to frequency shift (e.g., downshift) the RF communications signals 202(1)-202(N) to a plurality of defined RF frequencies (e.g., intermediate frequencies) prior to being combined by the analog signal combiner 400 into the combined RF communications signal 402.

Figure 5:
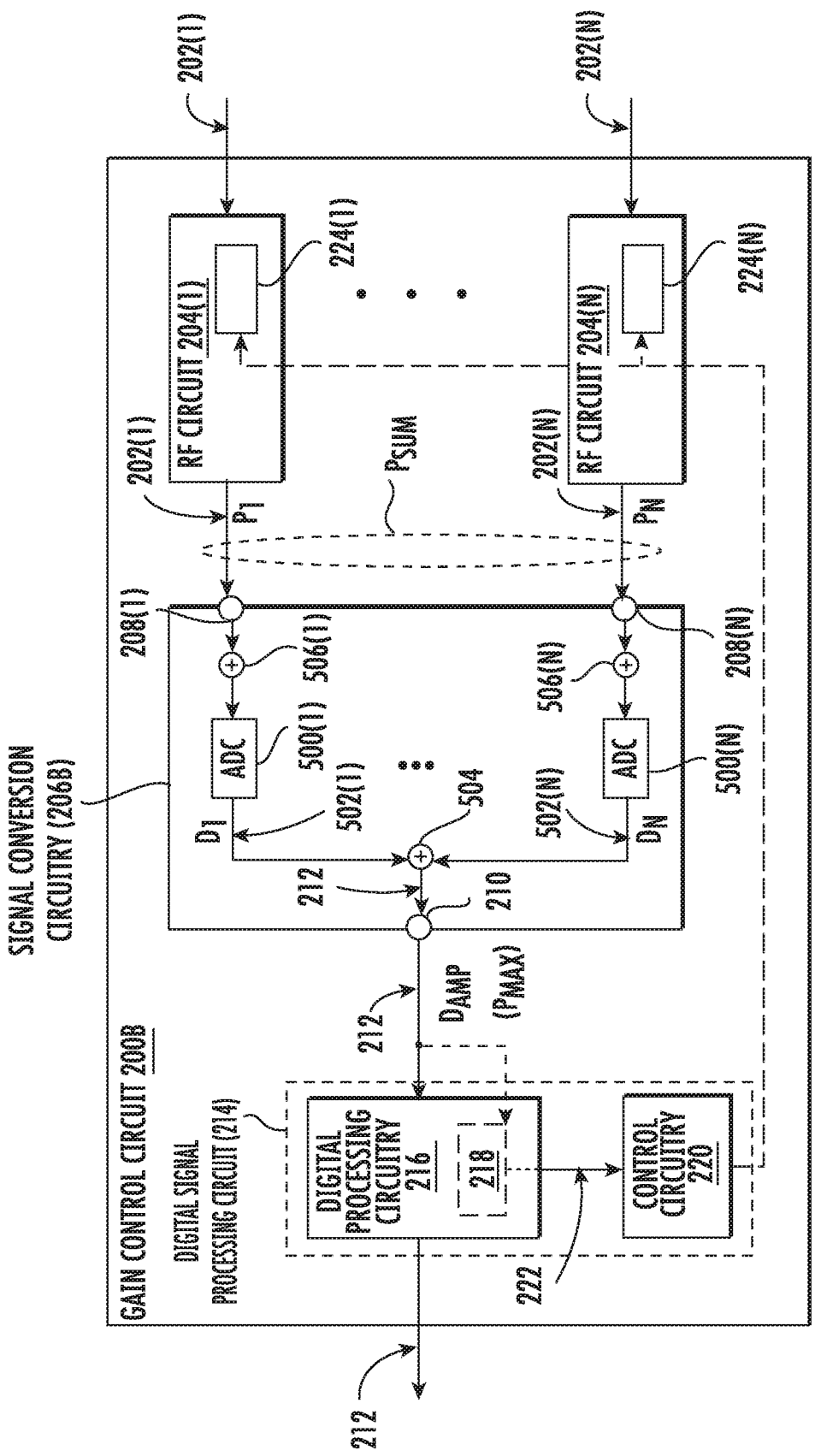
FIG. 5 is a schematic diagram of an exemplary gain control circuit, which is functionally equivalent to the gain control circuit of FIG. 2, with signal conversion circuitry implemented according to another embodiment of the present disclosure.

Also as previously mentioned, the signal conversion circuitry 206 may first convert the RF communications signals 202(1)-202(N) into a number of digital communications signals and then combine the digital communications signals to generate the combined digital communications signal 212. In this regard, FIG. 5 is a schematic diagram of an exemplary gain control circuit 200B, which is functionally equivalent to the gain control circuit 200 of FIG. 2, with signal conversion circuitry 206B implemented according to another embodiment of the present disclosure. Common elements between FIGS. 2 and 5 are shown therein with common element numbers and will not be re-described herein.

The signal conversion circuitry 206B includes a plurality of ADCs 500(1)-500(N) coupled to the RF signal inputs 208(1)-208(N), respectively. The ADCs 500(1)-500(N) are configured to receive the RF communications signals 202(1)-202(N) via the RF signal inputs 208(1)-208(N), respectively. The ADCs 500(1)-500(N) convert the RF communications signals 202(1)-202(N) to generate a plurality of digital communications signals 502(1)-502(N) having a plurality of digital amplitudes $D_1$-$D_N$, respectively.

The signal conversion circuitry 206B includes a digital signal combiner 504 coupled between the digital signal output 210 and the ADCs 500(1)-500(N). The digital signal combiner 504 is configured to receive the digital communications signals 502(1)-502(N) from the ADCs 500(1)-500(N), respectively. The digital signal combiner 504 combines the digital communications signals 502(1)-502(N) to generate the combined digital communications signal 212 having the digital amplitude $D_{AMP}$ representing the summed analog power level $P_{SUM}$ in the predefined number of binary bits and provides the combined digital communications signal 212 to the digital signal output 210.

In this regard, the digital signal combiner 504 may inherently determine the predefined number of binary bits representing the digital amplitude $D_{AMP}$. For example, the predefined number of binary bits may be determined by size of a register in the digital signal combiner 504. As such, the digital signal processing circuit 214 can be configured to prevent the summed analog power level $P_{SUM}$ from exceeding the maximum analog power level $P_{MAX}$ represented by the predefined number of binary bits inherently determined by the digital signal combiner 504. In addition, the digital signal processing circuit 214 can also prevent a sum of the digital amplitudes $D_1$-$D_N$ from exceeding a maximum digital amplitude that can be represented by the predefined number of binary bits inherently determined by the digital signal combiner 504. In this regard, the digital signal processing circuit 214 can control the selected RF circuit to attenuate the selected RF communications signal to reduce the sum of the digital amplitudes $D_1$-$D_N$ to below the maximum digital amplitude that can be represented by the predefined number of binary bits.

The signal conversion circuitry 206B may include a plurality of mixers 506(1)-506(N) provided between the ADCs 500(1)-500(N) and the RF signal inputs 208(1)-208(N), respectively. The mixers 506(1)-506(N) may be configured to frequency shift (e.g., downshift) the RF communications signals 202(1)-202(N) to a plurality of defined RF frequencies (e.g., intermediate frequencies) prior to being converted by the ADCs 500(1)-500(N) into the digital communications signals 502(1)-502(N).

Figure 6:
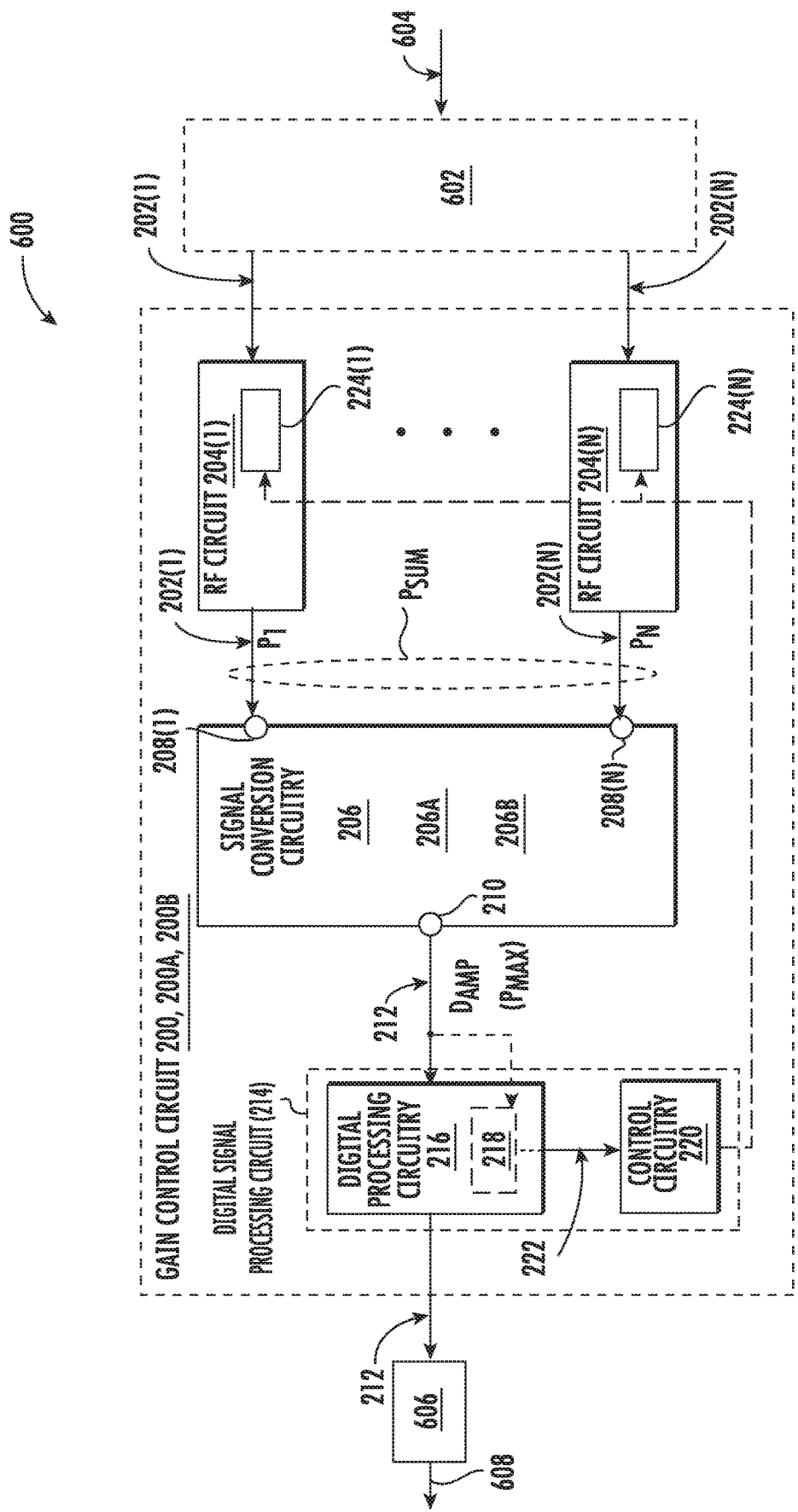
FIG. 6 is a schematic diagram of an exemplary remote unit configured to employ the gain control circuit of FIGS. 2, 4, and 5 to support dynamic gain control in a WDS.

The gain control circuit 200 of FIG. 2, the gain control circuit 200A of FIG. 4, and the gain control circuit 200B of FIG. 5 can be provided in a remote unit in a WDS to support dynamic gain control. In this regard, FIG. 6 is a schematic diagram of an exemplary remote unit 600 configured to employ the gain control circuit 200 of FIG. 2, the gain control circuit 200A of FIG. 4, and the gain control circuit 200B of FIG. 5 to support dynamic gain control in a WDS. Common elements between FIGS. 2, 4, 5, and 6 are shown therein with common element numbers and will not be re-described herein.

The remote unit 600 includes multiplexer circuitry 602. The multiplexer circuitry 602 is configured to receive an aggregated uplink RF communications signal 604 that includes the RF communications signals 202(1)-202(N) in a number of RF bands. The multiplexer circuitry 602 splits the aggregated uplink RF communications signal 604 into the RF communications signals 202(1)-202(N). The multiplexer circuitry 602 then provides the RF communications signals 202(1)-202(N) to the gain control circuit 200, the gain control circuit 200A, or the gain control circuit 200B.

The remote unit 600 includes media interface circuitry 606 coupled to the digital signal processing circuit 214. The media interface circuitry 606 may include a digital-to-analog converter (DAC) and an electrical-to-optical (E-O) converter for converting the combined digital communications signal 212 to generate an optical uplink communications signal 608.

Note that any of the communications signals, bands, and services described herein may be RF communications signals, bands, and services. Supported RF communications services in the WDSs disclosed herein can include any communications bands desired. Examples of communications services include, but are not limited to, the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The communications bands may include licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink). Further, the WDS can be configured to support any wireless technologies desired, including but not limited to Code Division Multiple Access (CDMA), CDMA200, 1xRTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

Figure 7:
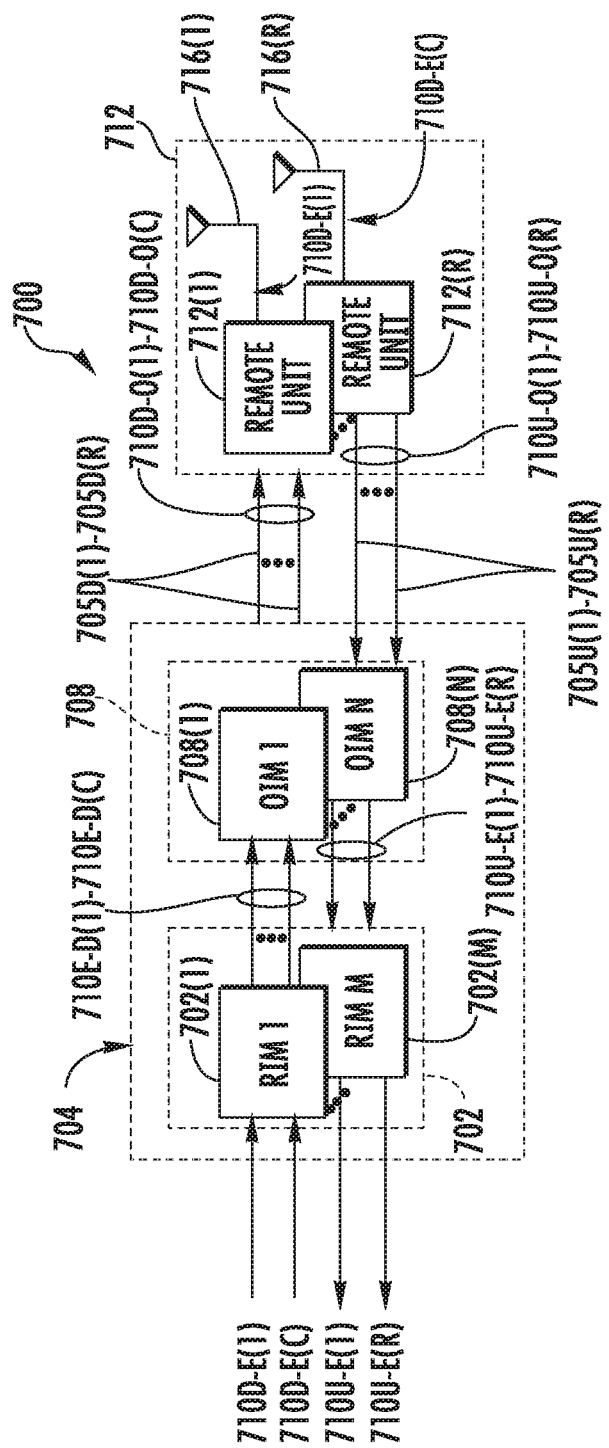
FIG. 7 is a schematic diagram of such an exemplary optical-fiber based WDS in which the remote unit of FIG. 6 may be deployed to support dynamic gain control in the WDS.

The remote unit 600 of FIG. 6 configured to support dynamic gain control can be provided in an optical-based WDS. In this regard, FIG. 7 is a schematic diagram of such an exemplary optical-fiber based WDS 700. The optical-fiber based WDS 700 is comprised of three (3) main components. One or more radio interfaces provided in the form of radio interface modules (RIMs) 702(1)-702(M) are provided in a central unit 704 to receive and process RF downlink communications signals 710D-E(1)-710D-E(C) prior to optical conversion into optical downlink communications signals. The RIMs 702(1)-702(M) provide both downlink and uplink interfaces for signal processing. The notations "1-M" and "1-C" indicate that any number of the referenced component, 1-M and 1-C, respectively, may be provided.

With continuing reference to FIG. 7, the central unit 704 is configured to accept the plurality of RIMs 702(1)-702(M) as modular components that can easily be installed and removed or replaced in the central unit 704. In one embodiment, the central unit 704 is configured to support up to twelve (12) RIMs 702(1)-702(12). Each RIM 702(1)-702(M) can be designed to support a particular type of radio source or range of radio sources (i.e., frequencies) to provide flexibility in configuring the central unit 704 and the optical-fiber based WDS 700 to support the desired radio sources. For example, one RIM 702 may be configured to support the Personal Communication Services (PCS) radio band. Another RIM 702 may be configured to support the 700 MHz radio band. In this example, by inclusion of these RIMs 702, the central unit 704 could be configured to support and distribute communications signals, including those for the communications services and communications bands described above as examples.

The RIMs 702(1)-702(M) may be provided in the central unit 704 that support any frequencies desired, including but not limited to licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 7, the RF downlink communications signals 710D-E(1)-710D-E(C) may be provided as downlink RF spectrum chunks to a plurality of optical interfaces provided in the form of optical interface modules (OIMs) 708(1)-708(N) in this embodiment to convert the unlicensed and/or licensed RF downlink communications signals 710D-E(1)-710D-E(C) into optical downlink communications signals 710D-O(1)-710D-O(C). The OIMs 708 may be configured to provide one or more optical interface components (OICs) that contain optical-to-electrical (O-E) and electrical-to-optical (E-O) converters, as will be described in more detail below. The OIMs 708 support the radio bands that can be provided by the RIMs 702, including the examples previously described above.

The OIMs 708(1)-708(N) each include E-O converters to convert the RF downlink communications signals 710D-E(1)-710D-E(C) into the optical downlink communications signals 710D-O(1)-710D-O(C). The optical downlink communications signals 710D-O(1)-710D-O(C) are communicated over a plurality of downlink optical fiber communications mediums 705D(1)-705D(R) to a plurality of remote units 712(1)-712(R). In a non-limiting example, at least one of the remote units 712(1)-712(R) is functionally equivalent to the remote unit 600 of FIG. 6. O-E converters provided in the remote units 712(1)-712(R) convert the optical downlink communications signals 710D-O(1)-710D-O(C) back into the RF downlink communications signals 710D-E(1)-710D-E(C), which are provided to antennas 716(1)-716(R) in the remote units 712(1)-712(R) to user equipment (not shown) in the reception range of the antennas 716(1)-716(R).

E-O converters are also provided in the remote units 712(1)-712(R) to convert RF uplink communications signals 710U-E(1)-710U-E(R) received from user equipment through the antennas 716(1)-716(R) into optical uplink communications signals 710U-O(1)-710U-O(R). The remote units 712(1)-712(R) communicate optical uplink communications signals 710U-O(1)-710U-O(R) over a plurality of uplink optical fiber communications mediums 705U(1)-705U(R) to the OIMs 708(1)-708(N) in the central unit 704. The OIMs 708(1)-708(N) include O-E converters that convert the received optical uplink communications signals 710U-O(1)-710U-O(R) into RF uplink communications signals 710U-E(1)-710U-E(R), which are processed by the RIMs 702(1)-702(M) and provided as RF uplink communications signals 710U-E(1)-710U-E(R).

Note that the downlink optical fiber communications mediums 705D(1)-705D(R) and uplink optical fiber communications mediums 705U(1)-705U(R) connected to each remote unit 712(1)-712(R) may be a common optical fiber communications medium, wherein for example, wave division multiplexing (WDM) may be employed to provide the optical downlink communications signals 710D-O(1)-710D-O(C) and the optical uplink communications signals 710U-O(1)-710U-O(R) on the same optical fiber communications medium.

Figure 8:
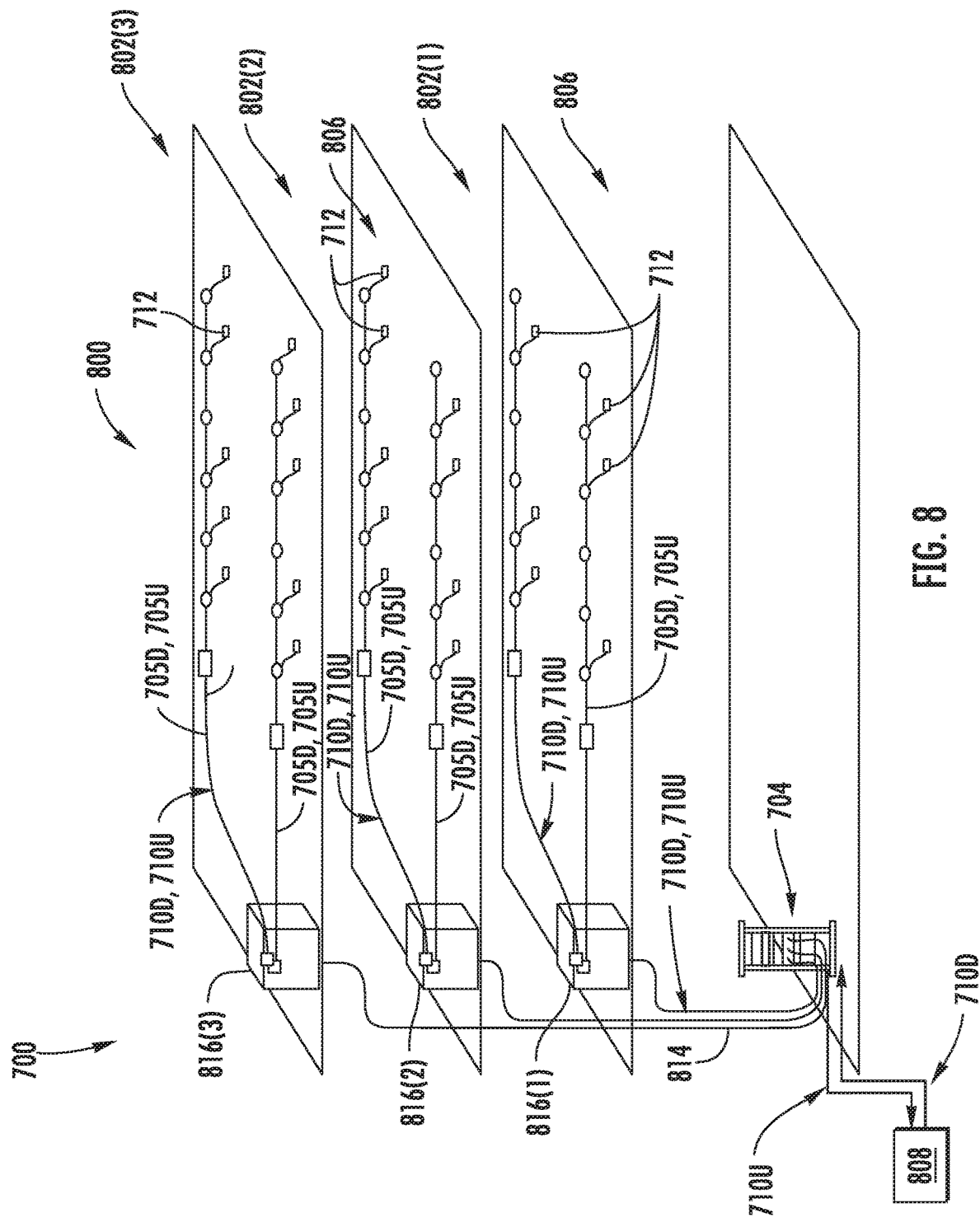
FIG. 8 is a partially schematic cut-away diagram of a building infrastructure employing the WDS of FIG. 7.

The optical-fiber based WDS 700 of FIG. 7 including the remote unit 600 of FIG. 6 configured to support dynamic gain control can be provided in an indoor environment, such as illustrated in FIG. 8. In this regard, FIG. 8 is a partially schematic cut-away diagram of a building infrastructure 800 employing the WDS 700 of FIG. 7. The building infrastructure 800 in this embodiment includes a first (ground) floor 802(1), a second floor 802(2), and a third floor 802(3). The floors 802(1)-802(3) are serviced by the central unit 704 to provide antenna coverage areas 806 in the building infrastructure 800. The central unit 704 is configured to receive downlink communications signals 710D from a signal source 808. The central unit 704 is communicatively coupled to the remote units 712 to receive uplink communications signals 710U from the remote units 712, similar to as previously discussed above for other WDSs. The downlink and uplink communications signals 710D, 710U communicated between the central unit 704 and the remote units 712 are carried over a riser cable 814 in this example. The riser cable 814 may be routed through interconnect units (ICUs) 816(1)-816(3) dedicated to each floor 802(1)-802(3) that route the downlink and uplink communications signals 710D, 710U to the remote units 712 and also provide power to the remote units 712 via the downlink and uplink communications medium 705D, 705U.

Figure 9:
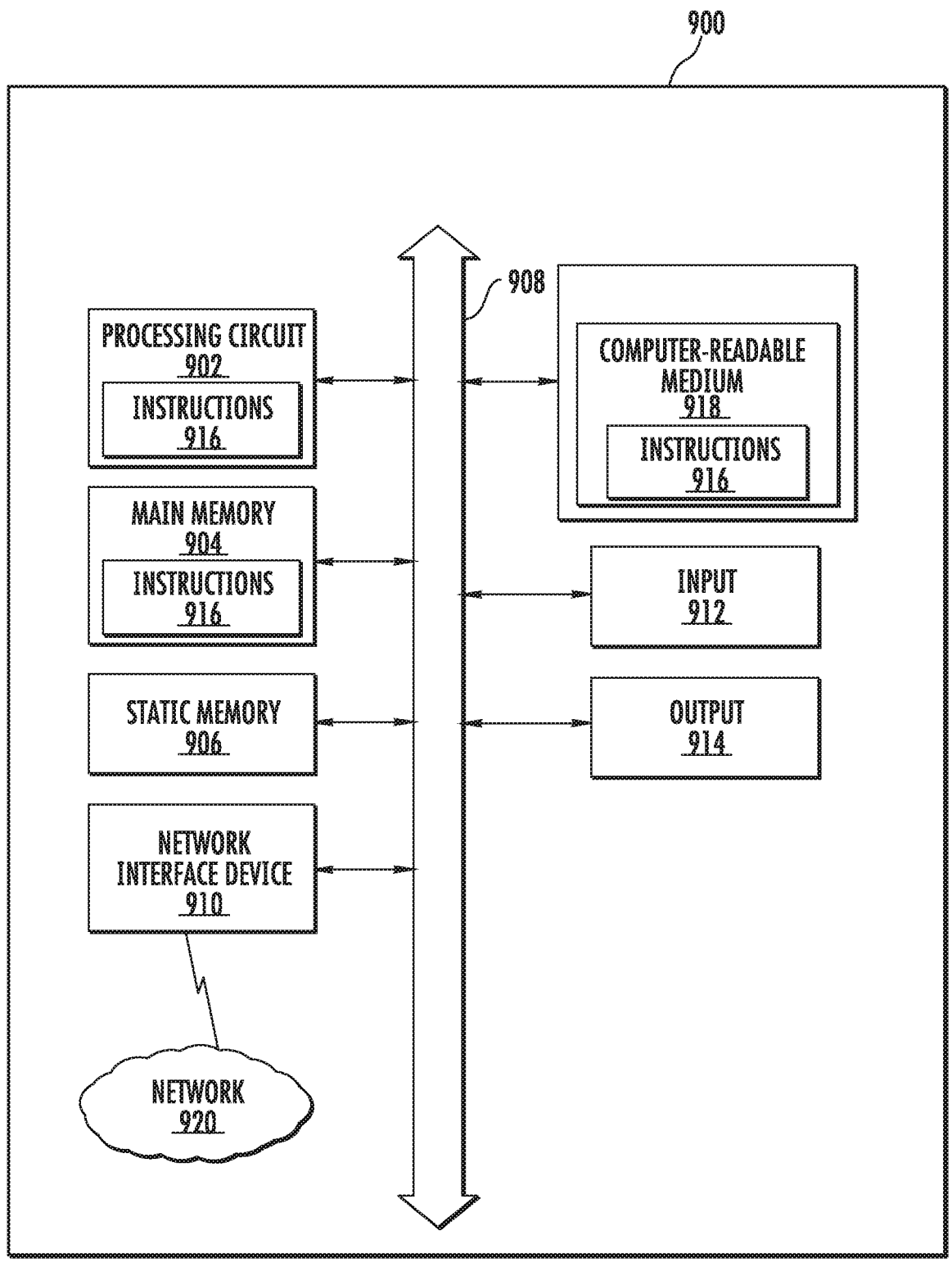
FIG. 9 is a schematic diagram representation of additional detail illustrating a computer system that could be employed in the gain control circuit of FIGS. 2, 4, and 5 to support dynamic gain control.

FIG. 9 is a schematic diagram representation of additional detail illustrating a computer system 900 that could be employed in the gain control circuit 200 of FIG. 2, the gain control circuit 200A of FIG. 4, and the gain control circuit 200B of FIG. 5 to support dynamic gain control. In a non-limiting example, the computer system 900 can function as the control circuitry 220 in FIGS. 2, 4, 5, and 6. In this regard, the computer system 900 is adapted to execute instructions from an exemplary computer-readable medium to perform these and/or any of the functions or processing described herein.

In this regard, the computer system 900 in FIG. 9 may include a set of instructions that may be executed to program and configure programmable digital signal processing circuits in a WDS for supporting scaling of supported communications services. The computer system 900 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 900 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 900 in this embodiment includes a processing circuit or processor 902, a main memory 904 (e.g., read-only memory (ROM), flash memory, dynamic random access memory (DRAM), such as synchronous DRAM (SDRAM), etc.), and a static memory 906 (e.g., flash memory, static random access memory (SRAM), etc.), which may communicate with each other via a data bus 908. Alternatively, the processor 902 may be connected to the main memory 904 and/or static memory 906 directly or via some other connectivity means. The processor 902 may be a controller, and the main memory 904 or static memory 906 may be any type of memory.

The processor 902 represents one or more general-purpose processing devices, such as a microprocessor, central processing unit, or the like. More particularly, the processor 902 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 902 is configured to execute processing logic in instructions for performing the operations and steps discussed herein.

The computer system 900 may further include a network interface device 910. The computer system 900 also may or may not include an input 912, configured to receive input and selections to be communicated to the computer system 900 when executing instructions. The computer system 900 also may or may not include an output 914, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer-readable medium 918. The instructions 916 may also reside, completely or at least partially, within the main memory 904 and/or within the processor 902 during execution thereof by the computer system 900, the main memory 904 and the processor 902 also constituting computer-readable medium. The instructions 916 may further be transmitted or received over a network 920 via the network interface device 910.

While the computer-readable medium 918 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A remote unit in a wireless distribution system (WDS) comprising a gain control circuit, the gain control circuit comprising:
    a plurality of radio frequency (RF) circuits configured to receive and amplify a plurality of RF communications signals, respectively;
    signal conversion circuitry comprising a plurality of RF signal inputs coupled to the plurality of RF circuits and a digital signal output, the signal conversion circuitry configured to:
        receive the plurality of RF communications signals via the plurality of RF signal inputs;
        generate a combined digital communications signal based on the plurality of RF communications signals, wherein the combined digital communications signal has a digital amplitude representing a summed analog power level of the plurality of RF communications signals in a predefined number of binary bits; and
        provide the combined digital communications signal to the digital signal output; and
    a digital signal processing circuit coupled to the digital signal output, the digital signal processing circuit configured to:
        determine whether the summed analog power level exceeds a maximum analog power level represented by the digital amplitude in the predefined number of binary bits; and
        in response to determining that the summed analog power level exceeds the maximum analog power level:
            determine a selected RF circuit among the plurality of RF circuits that generates a selected RF communications signal among the plurality of RF communications signals at a selected analog power level causing the summed analog power level to exceed the maximum analog power level; and
            control the selected RF circuit to attenuate the selected RF communications signal.

2. The remote unit of claim 1, wherein the selected RF circuit is controlled to reduce the summed analog power level to below the maximum analog power level.

3. The remote unit of claim 2, further comprising multiplexer circuitry configured to:
    receive an aggregated uplink RF communications signal comprising the plurality of RF communications signals; and
    split the aggregated uplink RF communications signal into the plurality of RF communications signals.

4. The remote unit of claim 3, wherein the multiplexer circuit is further configured to provide the plurality of RF communications signals to the plurality of RF circuits, respectively.

5. The remote unit of claim 4, further comprising media interface circuitry coupled to the digital signal processing circuit, the media interface circuitry configured to convert the combined digital communications signal to generate an optical uplink communications signal.

6. The remote unit of claim 3, further comprising at least one electrical-to-optical converter.

7. The remote unit of claim 6, further comprising at least one optical-to-electrical converter.

8. The remote unit of claim 1, further comprising at least one electrical-to-optical converter and at least on optical-to-electrical converter.

9. A wireless distribution system (WDS), comprising:
    a plurality of remote units; and
    a head-end unit (HEU) coupled to the plurality of remote units via a plurality of communications mediums, respectively, the HEU configured to:
        distribute a plurality of downlink communications signals to the plurality of remote units via the plurality of communications mediums, respectively; and
        receive a plurality of uplink communications signals from the plurality of remote units via the plurality of communications mediums, respectively;
    wherein at least one remote unit among the plurality of remote units comprises a gain control circuit, the gain control circuit comprising:
        a plurality of radio frequency (RF) circuits configured to receive and amplify a plurality of RF communications signals, respectively;
        signal conversion circuitry comprising a plurality of RF signal inputs and a digital signal output, the signal conversion circuitry configured to:
            receive the plurality of RF communications signals via the plurality of RF signal inputs, respectively;
            generate a combined digital communications signal based on the plurality of RF communications signals, wherein the combined digital communications signal has a digital amplitude configured to represent a summed analog power level of the plurality of RF communications signals in a predefined number of binary bits; and
            provide the combined digital communications signal to the digital signal output; and
        a digital signal processing circuit coupled to the digital signal output, the digital signal processing circuit configured to:
            analyze the combined digital communications signal to determine whether the summed analog power level exceeds a maximum analog power level that can be represented by the predefined number of binary bits; and
            in response to determining that the summed analog power level exceeds the maximum analog power level:
                determine a selected RF circuit among the plurality of RF circuits that generates a selected RF communications signal among the plurality of RF communications signals at a selected analog power level causing the summed analog power level to exceed the maximum analog power level; and
                control the selected RF circuit to attenuate the selected RF communications signal.

10. The WDS of claim 9, wherein the selected RF circuit is controlled to reduce the summed analog power level to below the maximum analog power level.

11. The WDS of claim 10, wherein the HEU is coupled to the plurality of remote units via a plurality of optical fiber communications media, respectively.

12. The WDS of claim 11, wherein the HEU is further configured to:
   receive a plurality of RF downlink communications signals;
   convert the plurality of RF downlink communications signals into a plurality of optical downlink communications signals, respectively; and
   distribute the plurality of optical downlink communications signals to the plurality of remote units via the plurality of optical fiber communications mediums, respectively.

13. The WDS of claim 12, wherein the HEU is further configured to:
   receive a plurality of optical uplink communications signals from the plurality of remote units via the plurality of optical fiber communications mediums, respectively; and
   convert the plurality of optical uplink communications signals into a plurality of RF uplink communications signals, respectively.

14. The WDS of claim 13, wherein the plurality of remote units is further configured to:
   receive the plurality of optical downlink communications signals via the plurality of optical fiber communications mediums, respectively; and
   convert the plurality of optical downlink communications signals into the plurality of RF downlink communications signals, respectively.

15. The WDS of claim 14, wherein the plurality of remote units is further configured to:
   receive the plurality of RF uplink communications signals;
   convert the plurality of RF uplink communications signals into the plurality of optical uplink communications signals, respectively; and
   provide the plurality of optical uplink communications signals to the HEU via the plurality of optical fiber communications mediums, respectively.

\* \* \* \* \*